Dec. 14, 1965   P. PRESUNKA   3,222,832
CROSSED LATTICE WALL STRUCTURE

Filed Nov. 26, 1962   3 Sheets-Sheet 1

P. Presunka
(inventor)

P. Presunka (inventor)

Dec. 14, 1965   P. PRESUNKA   3,222,832

CROSSED LATTICE WALL STRUCTURE

Filed Nov. 26, 1962   3 Sheets-Sheet 3

(inventor) P. Presunka

United States Patent Office 3,222,832
Patented Dec. 14, 1965

3,222,832
CROSSED LATTICE WALL STRUCTURE
Peter Presunka, 14 Claver St., Ottawa, Ontario, Canada
Filed Nov. 26, 1962, Ser. No. 241,104
2 Claims. (Cl. 52—207)

This invention pertains to building structures and aims to simplify the steps of achieving structural strength, placement of windows, doors and other useful wall apertures; to effect a greater efficiency in the utilization of building materials, and to construct such a dwelling structure in accordance with these teachings that also provides increased living volume, increased and variable amount of sunlight, and an increased scope for decorative arrangement in both exterior and interior of such a dwelling.

It is also an object of the present invention to teach a fuller utilization of logs which are left over as log cores in the plywood stripping or sawing process.

A still further object of the present invention is to teach a fuller utilization of log material which presently is discarded or used as mere fuel and is known by the term log slabs, being the rounded log slab cuts which convert the round log section into a rectangular section prior to sawing into lumber.

A still further object of the present invention is to reduce the round cross section of a green log so as to facilitate and quicken the drying or seasoning of the log without undue cracking and to achieve this in the most efficient and economic manner, and to enable the green log material to be used immediately in the building structure with minimized effects of warping and drying.

It is still a further object of the invention to utilize most effectively the small diameter logs which may be presently used only for their pulp content. Smaller logs which may not be economically sawn into lumber may be converted into effective building materials along the lines taught by the invention.

It is a still further object of this invention to provide a strong wall structure which will permit economical construction of a large living volume, and to maintain this enlarged living volume by large scale solar heating and by an improved method of ducting the return air for reprocessing.

It is also a further object of the present invention to construct, a versatile toy and model building structure which may be employed in constructing and assembling toy buildings or scaled-down models of homes and of other buildings.

In the usual practice of building, the functions of structural strength, insulation housing, exterior and interior decoration surfaces, and frames are separated among distinct and separate components of building materials. In the process of construction these components largely overlay one another. While this system is amenable to mass production of these components, no apparent economy in the building of a home has as yet been reflected. It appears that the building components have increased in number and complexity to such an extent that any economy resulting from mass production had been removed by the complexity of the problem and labour in assembling these into a dwelling. Among other objects, this invention aims to combine as many of the aforementioned functional features as possible into as few components of structure as possible. The individual members of the lattice structure described in this invention combine the functions of structural strength, of interior wall space for insulation and services such as wiring, plumbing, of a retaining framework for windows and sliding panels, as well as part of the decorative exterior and interior wall surfaces. The individual member or unit of this new structure is primarily a structural component which has a sufficiently great enough cross section and strength to accommodate the small amount of additional processing needed to endow it with the above mentioned other functional features in a structure.

It will become readily apparent that such combining of several components into one will result not only in economy of materials but also in even greater economy in labour, since the assembly and fitting of components used has been simplified.

A more detailed treatment of the invention will now follow with reference to the following drawings.

Figure 1:
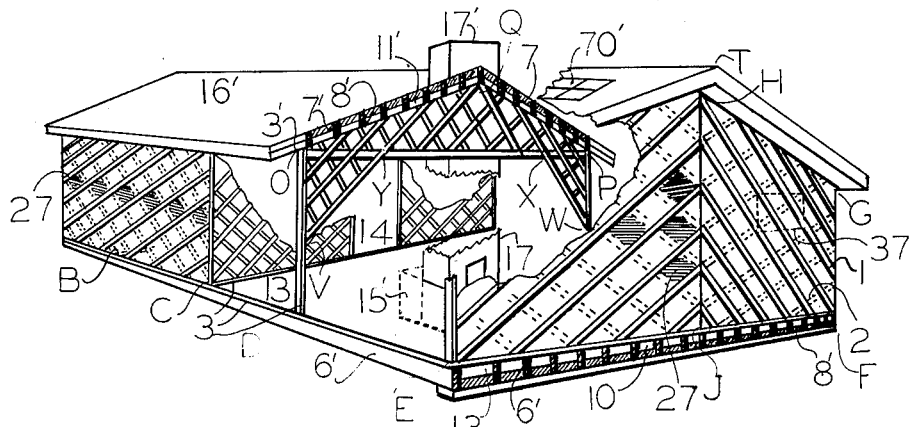
FIG. 1 is a 3-dimensional sketch of a dwelling according to the invention, with sections of its structures cut away to show additional features, and with uncovered spaces between the lattice to show exterior and interior lattice members.

The basic lattice structure of the present invention is illustrated in FIGS. 2, 3, 4 and 8. This structure consists of substantially two equal spaced and parallel arrays 70 and 80 of two pluralities of individual members 1 and 2 respectively. The slopes of these two arrays or rib-works are in opposition, so that every member of each array intersects a number of members in the other array along a substantially common plane interface designated by 90. The angle of slope from the vertical of both the arrays may vary considerably but in the interest of constant vertical loading and resistance to side wind loads, neither array should exceed a 45-degree angle from the vertical. FIG. 1 shows a house in which both the internal and external rib-works or arrays are inclined by an angle of 45 degrees to the vertical. The end wall EFGHI shows two half wall structures each inclined by a 45-degree slope in reversed symmetry about its vertical dividing line HJ.

Figure 7:
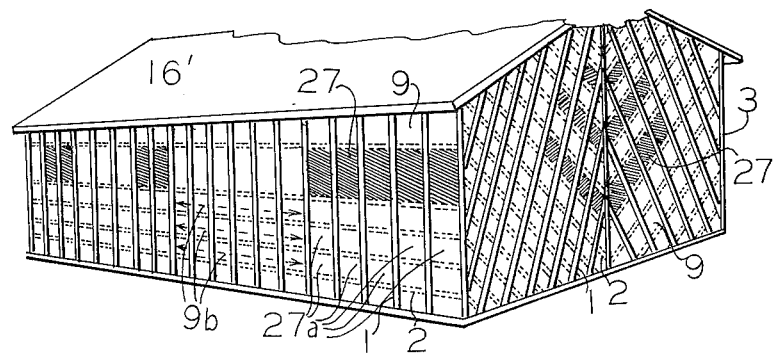
FIG. 7 is a 3-dimensional sketch of a dwelling in which wall structures utilize both the diagonally oriented lattice and an upright lattice (vertical and horizontal members), with covering panels omitted to show both the interior and exterior lattice work.
Figure 8:
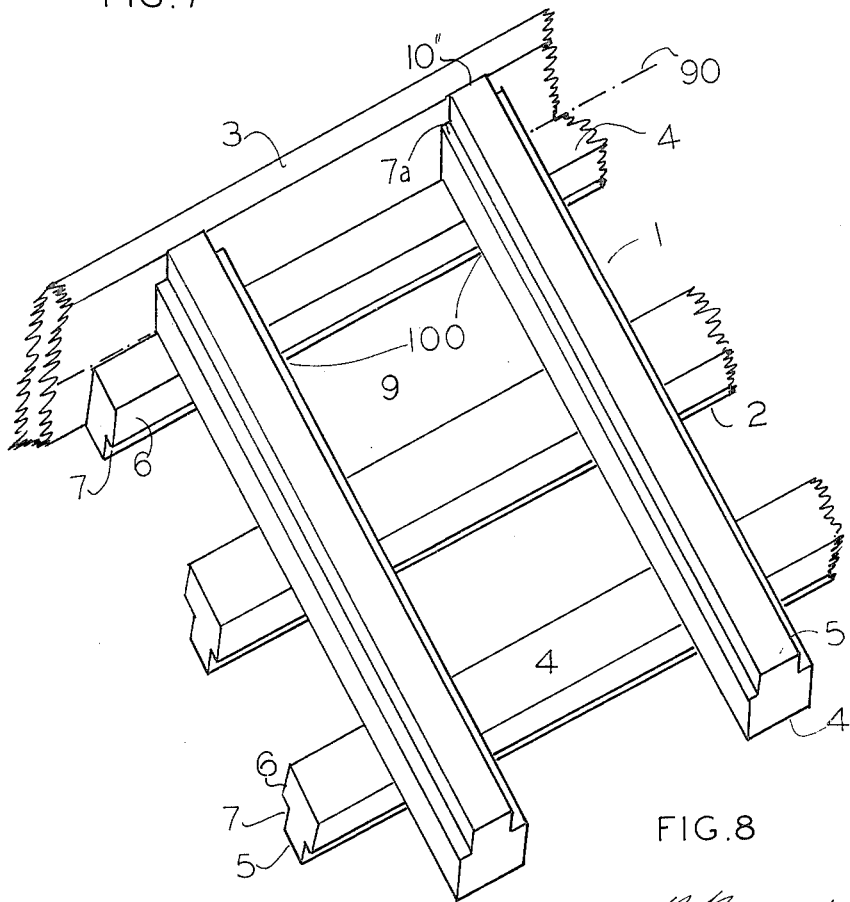
FIG. 8 shows a basic lattice work from usual rectangular section timbers in upright orientation (horizontal and vertical members).

In FIG. 7 the long wall of the dwelling is constructed of an upright lattice work in which the external array is vertical and the internal array is horizontal. FIG. 8 shows a portion of such upright lattice work together with one tying member 3 along one edge, to which the ends 10 are secured.

The ends 10″ of the member 1 and 2 of both arrays respectively (see FIGS. 2, 4 and 8) are secured by spikes 8 to a common tying member 3. This tying member 3 must withstand the horizontal tensile stresses as well as a horizontal shear along the interface plane 90 as well as the constant vertical shear stresses concentrated around ends 10″ of the two arrays. Members 1 and 2 are spiked together by heavy spikes 8 at every intersection by at least two spikes. The multiple reinforcement of such spiking together of this structure will lend it great rigidity as well as stability of form needed to admit uniform width panelling and window, etc. Such spiking will also prevent any undue tendency towards warping.

Figure 2:
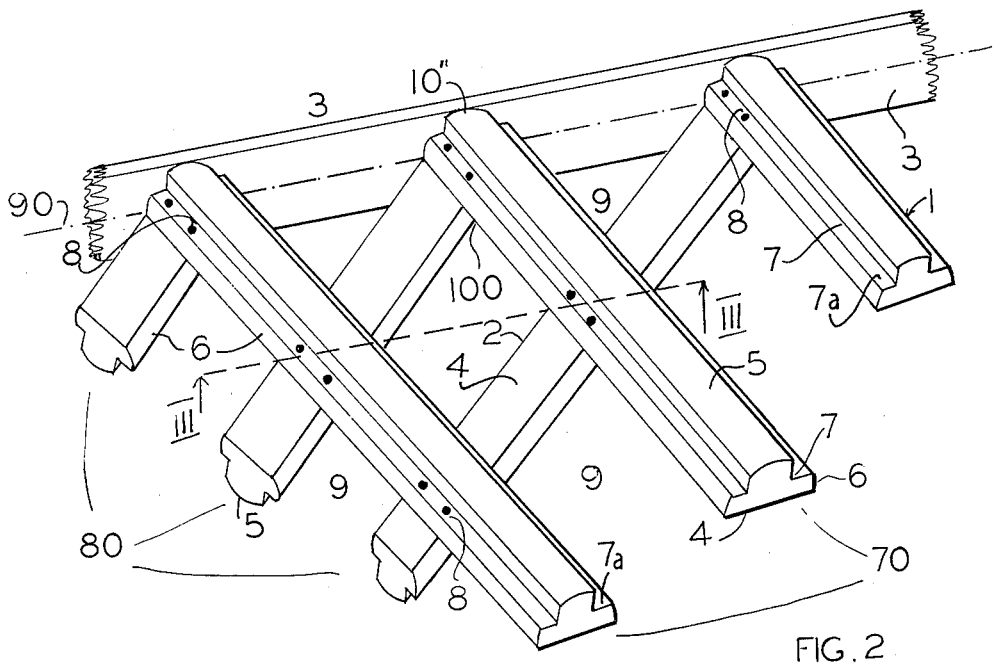
FIG. 2 is a 3-dimensional sketch of a diagonally oriented basic crossed lattice wall structure in which the individual structural members are processed from logs, or from presently unused slabs which are cut from sides of logs during sawing of logs into lumber.

FIG. 2 shows a portion of a lattice structure in which members 1 and 2 were obtained by ripping a round log along its longitudinal axis into two semicylindrical slabs, and cutting out two resesses 7 and so forming two shoulders 6 with flat beds 7a spaced away from the interface plane 90 (and from the plane side 4 of the member). These semicylindrical members are arranged into two parallel and regularly spaced arrays, with their plane or ripped sides in intersecting contact with each other, and with their rounded surfaces 5 facing outwardly from the structure. These rounded surfaces 5 may form the finished or decorative portion of the finished wall. FIG. 2 shows a lattice structure constructed from plywood log cores which possess almost perfectly circular cross section and a diameter of between 6 and 7 inches, presumably depending on the particular type of plywood used in the plywood stripping machine. These logs are approximately 8½ feet in length and come in several kinds of soft, semi-hard and hard woods ordinarily used for plywood materials. These plywood cores had been previously used to a limited extent as building log structures, but all these structures were arrayed in massive and closed horizontal or vertical arrays in the usual manner of log wall construction. In most of these log structures the log cross-section was not materially and efficiently reduced as in the present invention to assist drying and seasoning of the log without undue cracking. In some of these prior log building techniques, the reduction in log cross-section was achieved by removing slabs from two faces, by grooving or by a boring large round hole through the length of the log. In all these prior-art cross-section reducing methods these techniques were either wasteful of material or effort, or of both. These prior art log structures had the further disadvantage of not providing wall structure which would readily permit the installation of services, such as wiring, plumbing, or of insulation material and of windows and doors. The lattice wall scheme of the present invention also permits the use of shorter length of log units, because these members are spiked together at each intersection, this spiking at intersections also counteracting the tendency to warp with drying.

The lattice wall structure of FIG. 2 may be used with naturally occurring logs, since the taper effect on the logs could be reduced by using shorter lengths and matching logs of comparable diameter. The two recesses 7 which are cut in each member are equally spaced from each other and parallel to the plane face of ripping 4; and any thicker log sections would not affect the wall structure in any material way except to cause the round parts 5 to bulge out farther.

The lattice structure of FIG. 2 may be constructed also from slabs which are presently discarded in the lumber sawing process. These rounded members may have two conveniently spaced recesses 7 cut in them. These slabs may first be cut into convenient lengths so that their taper effect would be reduced, even prior to the cutting of the recesses, and these recesses may be differently spaced for smaller slabs. The lattice work of the present invention can readily utilize shorter lengths of members 1 or 2 since these are secured together at every intersection 100. In the building of a wall these slab members 1 or 2 may be alternated with a regular board of any convenient width, say 8″ to 14″. The regular board (of 1-inch thickness) would be seated in the recess 7 between any two adjacent members 1 or 2. If this construction is used, the lattice members would be placed alternately with the intervening boards and securing both in place, by nailing the slab at intersections and nailing the board in the recesses.

The parallel spaces 9 in the lattice structure are completed in accordance with the requirements and wishes of the user of the particular building being constructed. The size and nature of the building will also determine the cross sectional dimensions of the individual structural members 1 and 2 and also the spacing 9 between these members, due to the loading stresses imposed on such structure. If the building is a summer residence or cottage, covering panels designated by 11 in FIG. 3 may be used, without any insulating material 12, and window glass panes 27 in FIG. 3. These window panes inserted into spaces 9 of the structure may be arranged in attractive patterns, as shown by 27 in FIG. 1. If the usual type of large area, upright and rectangularly shaped window is desired, as shown dotted in the end wall of the dwelling shown in FIG. 1 and designated by 37, this window opening may be cut out after the lattice structure wall had been completed. This opening may be cut at any desired place; but if cut just on the inside of the intersections of members 1 and 2 so that whole intersecting nodes 100 are left intact, then the wall structure would be affected least by such openings. Openings for doors are similarly cut out. The door and window frames for these cut out openings 37, if any, may be formed from the members 1 or 2, by placing the plane face 4 against the butting ends of members 1 and 2, and turning the face or curved side 5 with the recesses 7 facing into the opening, so that these recesses may receive the window panes or doors as the case may be.

If no openings are cut for windows, and if only the available spaces in the lattice structure are used for window area, a maximum degree of rearrangement possibilities of window area and window patterns would result, and a further advantage of maintaining the maximum strength in the wall structure would result. These window panes could be readily moved out of their spaces and replaced with wall panelling, and placed elsewhere. Such simple window arrays are shown as shaded spaces 27 in the wall structures of a dwelling in FIG. 1. Even if larger window and door openings are cut, as shown in dotted lines 37 of FIG. 1, the cut-out timbers may be replaced into the wall structures and these openings may be moved to any other positions in the wall structure with considerably greater facility than in structures of the prior art.

Figure 3:
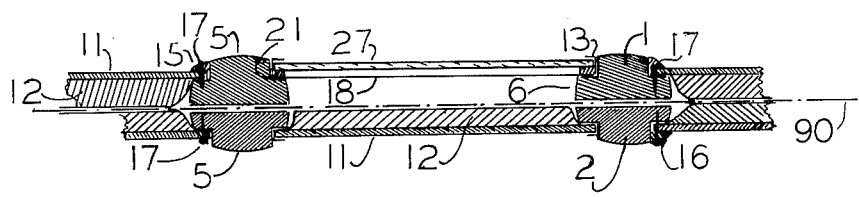
FIG. 3 illustrates a section through a diagonally oriented lattice wall which carries in it the necessary insulation, covering panels and windows.
Figure 4:
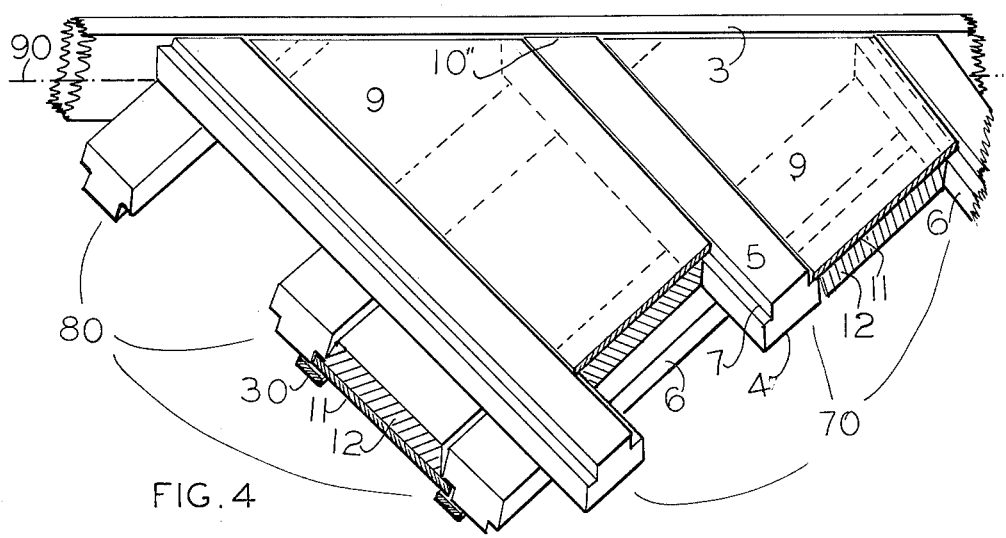
FIG. 4 is a 3-dimensional sketch of a basic crossed lattice wall structure in which the individual structural members are formed from the usual rectangular section timbers, and in which are included insulation and covering wall panels.

The method of placing window panes 27 and insulation materials 12 and covering wall panels 11 into the lattice structure spaces 9 is illustrated in FIGS. 3 and 4. The recesses 7 in each member 1 and 2 are parallel and are spaced a distance 28 above the plane face of intersection 90. Even with members 1 and 2 formed from natural logs, the plane interface 90 and the recesses 7 together define a regular array of spaces 9 and a regular volume-space 28 for insertion of insulation, as may be seen from FIGS. 2, 3 and 4.

The extreme right-hand portion of FIG. 3 shows two covering wall panels 11 in the recesses 7 of both members 1 and 2, with insulation material 12 and vapour barrier between these panels and the plane of interface 90. Such a panelling may well form the greatest part of the wall surface. The central space 9 in FIG. 3 shows a glass pane 27, and a screen 18, on one side of the interface plane 90, the window 27 being mounted in sliding relationship with members 1 and raised by spacers 21 to permit the glass pane 27 to slide over the wall covering panel which forms the wall in the adjoining space 9, next to the window and between the same members 1. On the other side of the interface 90, of this central space, an insulated panel wall covering 11 is also mounted in a sliding relationship with members 2. This panel 11 may also be raised by a spacer similar to 21, but it may then be formed from an insulating material itself, and may then also slide over the adjacent wall covering panels 11, when slid open to expose the window 27 to light.

The extreme left of FIG. 3 shows a scheme of wall covering in which insulation is used on only one side of the interface 90. And only covering wall panels are used on the other side.

The panels 11 which cover spaces 9 and which form the interior wall surface may be arranged in colour patterns, which, contrast or blend with the decorative surfaces 5 of the individual structural members 2 of the lattice structures. These decorative or finished surfaces 5 may be convex, as in half-log arrays of FIG. 2 or they may be flat surfaces 5 as in FIGS. 4 and 8 which could be made to blend into an essentially plane wall surface. These interior panels may be held in place by a quarter-round moulding 16, or by a sliding channel and retaining means 13 as shown in FIG. 3 if these panels are to be slidingly mounted.

The exterior panels 11 may be secured in a fixed position in recesses 7 by nailing them down to the flat ledge 7a, and injecting caulking material 15' into the groove or recess 7 over the nailed edges of these panels. A great variety of caulking materials and rapid caulking dispensing appliances are available on the market today. Among the more recent are a great variety of polysulphide materials, well known variants of a parent product designated by the trade name "Thiocol." These sealants do not harden, but retain their mastic consistency and retain their sealing qualities even under a hundred percent increase in any one linear dimension, such as may occur to a joint under wood drying or warping conditions. It is also conceivable that sealants which are cheaper may be used in combination with covering moulding strips 16 in FIG. 3 and strips 30 in FIG. 4 to effect sufficiently good weather sealing.

It may also be practical to use self foaming semirigid resin or polyurethanes which possess closed cell structure, good adhesion qualities and sufficient resilience to accommodate any drying or warping tendencies along the joints in the recesses 7. These two-phase self-foaming compounds may be readily brought together, mixed and dispensed in a proper and even quantity into the joints and crevices, in which the mixed resin would foam and bond itself to the crevice walls. Wood preserving compounds may also be applied over the surfaces of members 1 which are exposed to weather.

FIG. 1 shows a sketch of a dwelling in which are shown interior partition walls at points B and C and a roof supporting truss at point D. The interior partition walls conform to the exterior shell of the house reinforcing the walls and acting as a support for the roof structure, since the ceiling is absent. The roof truss VOQPWX is designed to support the vertical roof load as well as to rigidify the house in shear to withstand side wind forces on the walls over the lengths where interior partition walls are absent. The horizontal tying beam OP of the truss acts as a tying member for the lattice structure of the truss as well as a tension beam for the vertical roof load. Part of the vertical roof load will also be carried by the extension corner trusses VOY and WPX.

The truss structure as well as the interior partition walls and the gable ends all carry stout tying beams over their sloping edges over which are laid deep roof beams 7' longitudinally along the length of the building. These beams are seated properly and secured to these tying lattice beams 3 by notching flat seats or nailing wedges and blocks, the blocks supporting the beams in their upright orientation. The deep beams provide the needed strength to support the roof over the somewhat long spans between tying beams. The lower edges of these roof beams would also show on the inside and would have a decorative valve which would harmonize well with this type of building structure.

In an open ceiling structure shown in FIG. 1 the space between beams 7' could be used to house the return air ducts 11' (FIG. 1 and 5) which would collect the heated stale air which usually collects in the upper regions of the dwelling living volume. Intake openings of these air ducts should be located reasonably centrally of each room at the highest point under the roof, so as to be equally effective for any part of the room. The horizontal collecting air ducts 11' of FIGS. 1 and 5 may then be placed directly under the insulating layer and covered with ceiling covering panels placed in the spaces between the deep roof beams. These covering ceiling panels support the thick insulating layer placed directly under the roof covering and also provide the decorative surface covering over the spaces between the deep roof joists. These panels are placed some distance above the bottom edges of these beams so as to expose part of these beams, which should be chosen for their strength and decorative effects.

Figure 5:
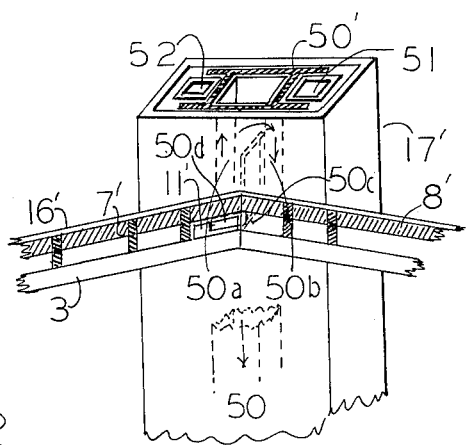
FIG. 5 shows a 3-dimensional sketch of a chimney structure to which a return air duct system may be connected such as described in a dwelling illustrated in FIG. 1.

The chimney structure 17' in FIG. 1 may be conveniently used to conceal, and to form part of the return air duct system for such a dwelling. The horizontal air ducts 11' which are placed between the roof beams 7' (FIG. 1) may be connected through openings made in such chimney and designated by 11a in FIG. 5. A special heat collecting flue should preferably be constructed, with a heavy metal heat conducting jacket and metal fins 50' in FIG. 5 surrounding the hot furnace flue 52. Flue 51 of FIG. 5 is still another flue which may be connected with the fireplace 16 of FIG. 1. The heat collecting flue 50 is partitioned into an input portion 50a by a partition wall 50c, and the remaining volume 50b of the heat collecting flue 50. The partition 50c seals off the bottom of the input portion 50a, but leaves an opening at the top, so that the input portion 50a forms a continuous air flow path with the entire length of the chimney flue 50 to the return air intake of a heating unit 15' or other air processing unit placed near the bottom of the chimney 17'. It is therefore obvious that the above described return air duct system is particularly effective for heating purposes since the already heated stale air which collects against the roof is collected and is further pre-heated by passage through the heat collecting chimney flue 50 over a chimney path length which may exceed the chimney height, as shown in FIG. 5. The top of the special heat collecting flue 50 is sealed with an insulating plug, not shown in FIG. 5. A strong air pulling fan placed at the bottom of the chimney flue 50 will draw the return air down the flue against the upwardly directed heat-induced air flow.

The building of FIG. 1 shows a basementless dwelling. This may be justified if the structure of the present invention can provide an increased structural strength which would permit the construction of greater floor space and greater height or living volume, at a reasonable cost. Dwellings with basements may provide additional living volume, but this basement living volume is not as accessible nor sufficiently lighted by natural daylight as is the ground level floor. The basement has the further disadvantage of conducting away a very large portion of heat into the ground. The moist cement walls of the basement provide a strongly conductive path to carry away the large part of the heat provided. Even if the heat difference across these walls is not as great as it is across the walls of the superstructure, the conductivity of cement walls is many times greater, which may well result in a loss of the greater portion of the heat supplied.

The above dwelling of FIG. 1 shows deep joists 6', with the lower part of their depth filled with heavy insulating layer 8'.

Figure 6:
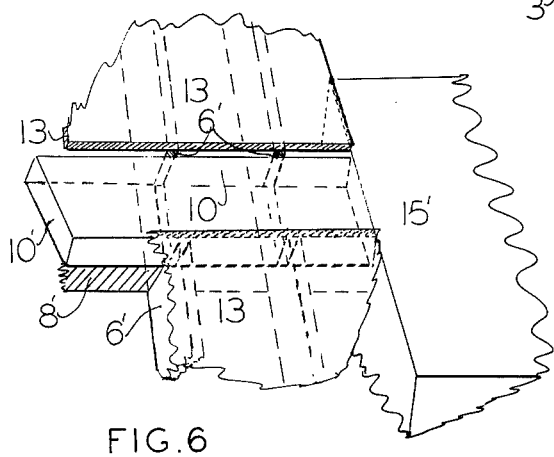
FIG. 6 is a 3-dimensional sketch of a hot air input duct scheme which may be used in such a dwelling as shown in FIG. 1.

The dead air space between the floor 13 and top of thick insulation layer 8' may be used to include hot air ducts 10', shown in FIGS. 1 and 6. Also cut-outs in the upper parts of the beams 6' may be made to house transverse heat ducts 10' which provide a hot air path from heating unit 15 across the width of dwelling, and feed the individual hot air ducts 10' which are placed between the deep joists, just under the floor 13.

The hot air unit may be housed in a small sub-basement, or small insulated dug-out with inside or outside access to it. A crawl space is incorporated under the beams, and footings and chimney are placed below the frost line, or on solid bedrock. It will be obvious that the heating system described above is free from heat loss to a large ground cavity or basement.

The present invention also provides a wall structure which lends itself to vary the window area in any wall at will. The sliding insulated panels 11 and 12 in FIG. 3 may be slid over the window placed on the oppoiste side of the wall interface 90 so as to provide heat and light proof wall during dull periods of the day or night; while during the cold sunny days, these panels may be slid away to expose increased glass area to sunlight. Large scale solar heating may thus be employed to further lower the heating cost.

The large, sunny dwelling which could be built along these teachings would have other desirable features besides increased volume and increased economy of constuction and upkeep. The higher walls and open ceiling provides space and volume for recreational facilities which cannot be accommodated in a present average income home. The lattice partition walls may be sealed off completely by panels in spaces 9 or the upper spaces may be left open for increased air circulation. The facility with which redecoration may be done is considerable, since the panels with different colours may be interchanged between walls in various rooms, and different colour patterns may be employed in any wall as well. Translucent glass panels may be used in wall spaces 9 in outer and inner partition walls. The open ceiling construction also is well suited to the use of sky-lighting. A skylight 70' is shown in FIG. 1. Insulated sliding panels are placed between roof beams 7' in sliding relationship therewith and under the skylight glass panes 70' to cover or expose them to light. These panels slide in the horizontal, and would take little effort to move them, which may be done by a spring-loaded pull cord system or by an automatic system, activated by a manually operated switch or by some automatic condition sensing means. Such automatic arrangements may be set up to vary the required window area in the walls as well.

The method of construction employed in this building structure is uniform and requires very little planning, since larger window openings, if any, and door openings may be cut out after the wall structure has been completed. The individual structural members 1 and 2 are provided in completely finished form, with sloping end cuts 10' which are secured to the tying plates 3 as well as in proper lengths for any particular need. The joints 11' in FIG. 2 are made at the ends of square or straight cuts by nailing them securely at the points of intersections 100. The tying members 3 permit ready tying in of walls at corners or at any partition wall joints. The erection of the roof is also rendered very straight forward. The mode of completing the covering of spaces 9 has already been dealt with previously. Insulation may be placed after wiring but the plumbing piping is placed on the inside of the interface plane 9 directly under the interior panelling.

From the foregoing description it will appear quite obvious that the present invention teaches a method and structure which may be practiced and built by one possessing only an average degree of skill, and by this simplicity feature is effected a further saving by utilizing only semiskilled labour.

The lattice structure is so simple that it may enable an individual with an average skill to undertake the task of building his house by himself. Only a supply of structural members 1 and 2 without any costly preassembly of complex parts as in present prefabricated homes, would be needed. This type of structure, therefore, offers to a prospective home owner a much greater scope for giving expression to his living requirements in his home, as well as providing greater facility for modification and redecoration.

The further object of providing a toy or model house construction may be readily realizable along the lines already described, modified only by a suitable scale factor. It will be readily apparent that if a linear scale of $\frac{1}{10}$ of full scale is used, then the area or sections would be $\frac{1}{100}$ of full scale, and the volumes and weights of materials would be $\frac{1}{1000}$ of full scale.

The lattice arrays may be secured by predrilled holes and dowels or pins provided instead of nailing as indicated by 8 in FIGS. 2, 4 and 8. These predrilled holes may be drilled along the whole length of each member of both arrays 70 and 80 so that the lattice may be arranged for any spacing. Tying members 3 may also be regularly drilled over the entire length.

The covering panels 11 and window panes 27 and insulation may be separately provided in a range of widths. Windows and panels may be retained with an adhesive strip or mastic adhesive material or plug-in socket. Plumbing and electrical service installations may also be provided, as well as the heating and ventilation duct systems and any other service lines.

The above described lattice constructions will provide an economical and a versatile teaching tool for young children as well as for more advanced technical training establishments.

I claim:

1. A crossed lattice wall structure comprising:
    (a) two oppositely facing building structures secured together in back-to-back relationship,
    (b) each of said building structures comprising a spaced parallel array of longitudinal building components,
    (c) each of said building components having a plane inner face and an outer surface said outer surface including two parallel recesses,
    (d) each of said recesses having a flat ledge which is parallel to and spaced from said plane inner face,
    (e) said building structures having said plane inner face lying in one common plane and said outer surface facing away from said common plane,
    (f) said spaced parallel array defining parallel spaces between the recesses of said adjacent longitudinal building components,
    (g) in said cross lattice wall structure each of said longitudinal building components of one of said back-to-back building structures contacting in intersecting relationship a plurality of building components of another one of said back-to-back building structures,
    (h) said components of both said building structures being inclined at an acute angle from the vertical, and
    (i) securing means securing together said building components at their points of intersection,
    (j) covering panels, each being independently placed in said spaces and having edges of said panels coverin and securing to said ledges of said recesses of adjoining components in said array.

2. A cross lattice wall structure for use in toy buildings or scale model building construction, consisting of two joined back-to-back building structures, each structure consisting of:
    (a) a spaced and parallel array of longitudinal building components, each having a plane inner face and an outer face in which are notched two outwardly facing open recesses, said recesses dividing said outer face into an exterior surface and two shoulders extending along edges of said exterior surface, said recesses being parallel and lying in a plane spaced from and parallel to said plane inner face, and plane inner face of each of said building components in said first array lying in one common plane and defining a back side of said building structure, said outer face of each facing away from said common plane to define an exterior face of said array,

9

(b) said parallel arrays being placed in back-to-back relationship so that said back sides of said building structures are in contact along said common plane, and so that each of said longitudinal building components in one of said building structures intersects a plurality of said longitudinal building components in other said building structure, all said building components making an acute angle with the vertical, (c) securing means securing together intersecting ones of said building components, said securing means consisting of regularly spaced holes drilled along a line parallel to longitudinal axes of said building components, and pins insertable into said holes when said holes are aligned at said points of intersection for selected spacing between said building components of each array and for selecting an angle of intersection of said components of said arrays, and (d) covering panels and window panes inserted into spaces defined by the recesses of said adjacent components of said array and attached to said shoulders, and (e) mounting means mounting selected ones of said covering panels and window panes in sliding relationship in said spaces.

References Cited by the Examiner

UNITED STATES PATENTS

| | | | |
|---|---|---|---|
| 220,429 | 10/1879 | Russell | 52—70 |
| 424,525 | 4/1890 | West | 52—665 |
| 1,528,397 | 3/1925 | Brenner | 52—467 |
| 1,943,033 | 1/1934 | Midby | 52—233 |
| 2,037,007 | 4/1936 | Conahey | 52—310 |
| 2,293,431 | 8/1942 | Frease | 52—488 |
| 2,463,612 | 3/1949 | Grudda | 52—233 |
| 2,587,985 | 3/1952 | Elmendorf | 52—434 |
| 2,619,686 | 12/1952 | Dombrowski | 52—233 |
| 2,639,471 | 5/1953 | Neves | 52—637 |

FOREIGN PATENTS 1,275,933   10/1962   France.

FRANK L. ABBOTT, *Primary Examiner.*

EARL J. WITMER, JACOB L. NACKENOFF,
*Examiners.*

R. A. STENZEL, *Assistant Examiner.*